United States Patent

[11] 3,598,194

[72] Inventors Joachim Wappler
11 Clayhall Cresent, Downsview, Ontario, Canada;
Arno C. Schwarz, 55 Oakmount Road, Apt. 1503, Toronto 5, Ontario, both of, Canada
[21] Appl. No. 746,717
[22] Filed June 10, 1968
[45] Patented Aug. 10, 1971

[54] FINAL DRIVE FOR TERRAIN VEHICLE
5 Claims, 7 Drawing Figs.

[52] U.S. Cl. .................................................. 180/6.2, 74/227, 74/242.11
[51] Int. Cl. ................................................... B62d 11/06
[50] Field of Search .......................................... 180/6.2, 6.48, 6.66, 22, 23; 74/665 G, 242.11, 242.11 E, 242.16, 227

[56] References Cited
UNITED STATES PATENTS

| | | | |
|---|---|---|---|
| 976,115 | 11/1910 | Bard ............................ | 74/242.11 |
| 3,052,311 | 9/1962 | Leedom ....................... | 180/6.66 |
| 3,180,305 | 4/1965 | Gower-Rempel ............ | 180/6.48 X |
| 3,318,210 | 5/1967 | Schwamborn et al. ....... | 180/6.2 X |

FOREIGN PATENTS

| | | | |
|---|---|---|---|
| 813,776 | 5/1959 | Great Britain ................ | 74/242.16 |
| 708,724 | 5/1965 | Canada ........................ | |

Primary Examiner—Leo Friaglia
Assistant Examiner—John A. Pekar
Attorney—George A. Rolston

ABSTRACT: A side drive train system for motor driven vehicles with wheels having a belt and pulley system associated with the axles of the wheels for rotating the same where one axle is driven directly or indirectly from the side drive train system.

INVENTORS
JOACHIM WAPPLER
ARNO C. SCHWARZ

BY George A. Rolston

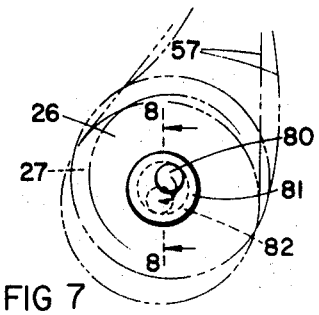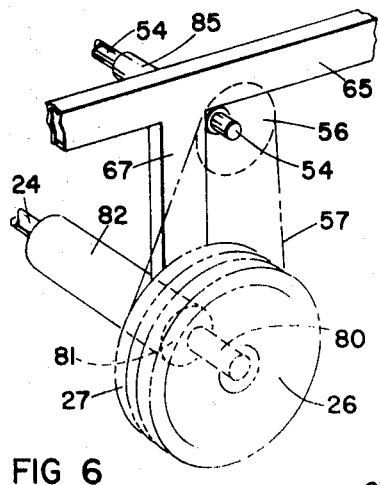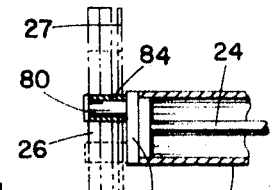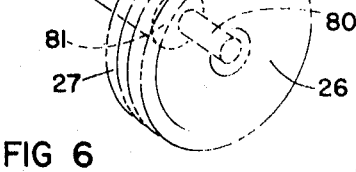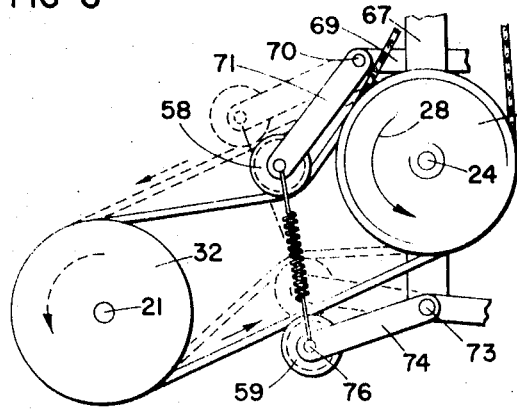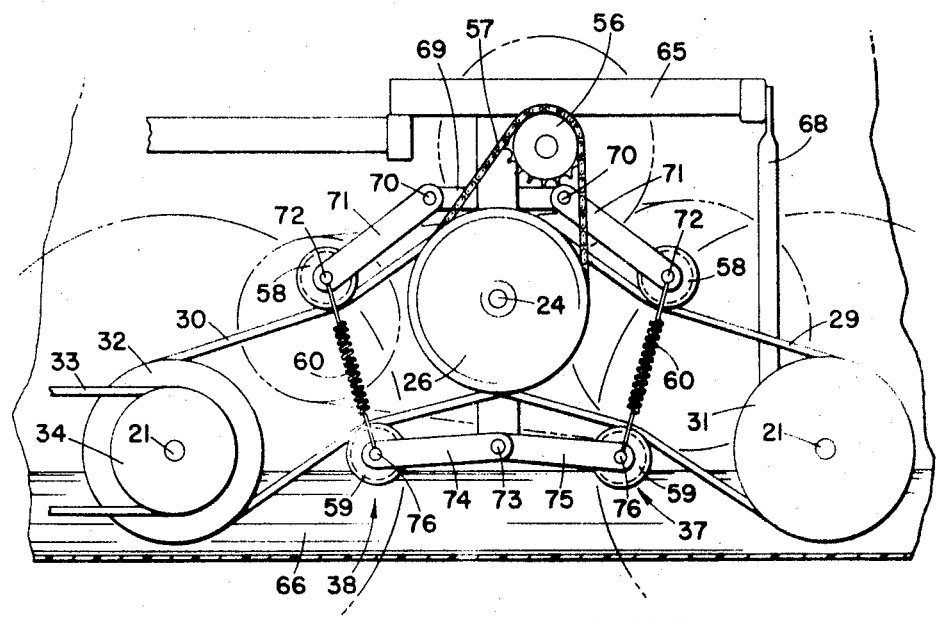

FINAL DRIVE FOR TERRAIN VEHICLE

This invention relates to a vehicle of the type which is capable of propelling itself over land of any type and water, and in particular to a driving mechanism for use with such a vehicle having a belt and pulley mechanism associated with a drive means for braking, steering, throttling and effecting variations in the power transmitted to the wheels of the vehicle and the speed of rotation of the wheels.

One example of this type of vehicle has a chain and sprocket driving mechanism in association with the wheels of the vehicle. As is well known the alignment of the sprockets is critical to ensure that the chains run satisfactorily and such critical alignment involves substantial additional manufacturing costs. In addition, with this type of vehicle using low-pressure tires the diameter of the tires is entirely dependent upon the pressure and even minor variations will produce major changes in diameter. As a result the wheels will try to run at different speeds and this has been a major cause of difficulty with chain drives in the past. Furthermore, in such prior vehicles a separate braking system was required to be used with the power transmission system and it is necessary to have the power transmission incorporating two clutches which had to be declutched simultaneously on both sides at once for stopping the vehicle. In addition, the use of chain drives requiring accurate tension adjustment for efficient operation involves the use of devices for adjusting the location of the sprockets since other forms of tensioners are generally speaking unsuccessful when used with chains. In multiple chain drives such as were used in the prior art, the movement of one sprocket would therefore require the movement of several other sprockets which greatly increases the cost of manufacture.

It is an object of this invention to provide a driving mechanism for a motor-driven vehicle using a belt and pulley mechanism for transmitting power to the wheels of the vehicle.

It is another object of this invention to provide a belt and pulley mechanism for use with a motor-driven vehicle which is extremely light in weight and simple to assemble.

This invention provides a drive means which can be used with a belt and pulley driving mechanism to transmit the power from an engine to the wheels. The belt and pulley mechanism is easily assembled with relatively sloppy tolerances permitted and simple to maintain. The pulleys may be positioned fairly accurately in relationship to the belts however the precise tolerances required for a chain and sprocket means are not necessary here. The belt and pulley mechanism is used to transmit the power from the engine to wheels on each side of the vehicle separately and independently of each other.

The foregoing and other advantages will become apparent from the following description of a preferred embodiment of the invention which is here given by way of example only with reference to the following drawings, in which like reference devices refer to like parts thereof through the various views and diagrams, and in which:

FIG. 4 is an elevation view of a drive pulley associated with the pulleys on the axles of the different wheels;

FIG. 5 is an elevation view showing the wheels being driven by the engine, in dotted lines, and showing the wheels dragging with the engine shut off, in solid lines;

FIG. 6 shows a perspective view of a means for adjusting the distance between the sprockets to remove the need for the tension means to keep the belts taut;

FIG. 7 is a plane view of the driven sprockets in two positions, one with a loose chain thereon and the other with the chain tightened up thereon; and, FIG. 8 is a sectional view along the line 8-8 shown in FIG. 7.

Figure 1:
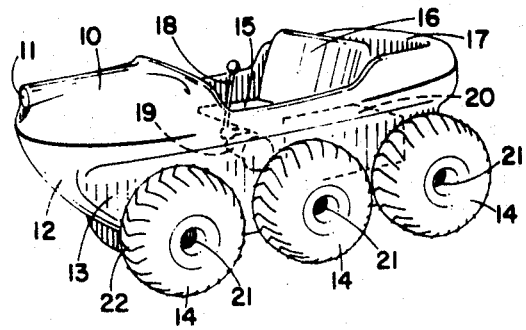
FIG. 1 is a perspective view of the vehicle embodying the invention.

FIG. 1 illustrates a vehicle embodying the invention, it will be seen that the vehicle has a body 10 with a headlight 11 and an undercarriage 12 having channels 13 on either side thereof in which wheels 14 are positioned. Preferably three wheels 14 are rotatably associated with the body 10 on each side thereof. The body 10 may be made of any suitable light strong material, preferably fiberglass. In the body 10 is provided a seat 15 for the operator with a back 16 and a deck 17. A control stick 18 is provided for the operator to steer and brake the vehicle. An internal combustion engine 19 and a drive means 20 are housed in the body 10 being shown in dotted lines located under the seat 15. Wheels 14 are mounted on axles 21 and are provided with raised lugs 22 which assist in providing a grip between the wheels 14 and the land over which the vehicle is travelling. There is no type of suspension system provided as a need for such a system is removed by employing wheels 14 which are of the low-pressure type.

Figure 2:
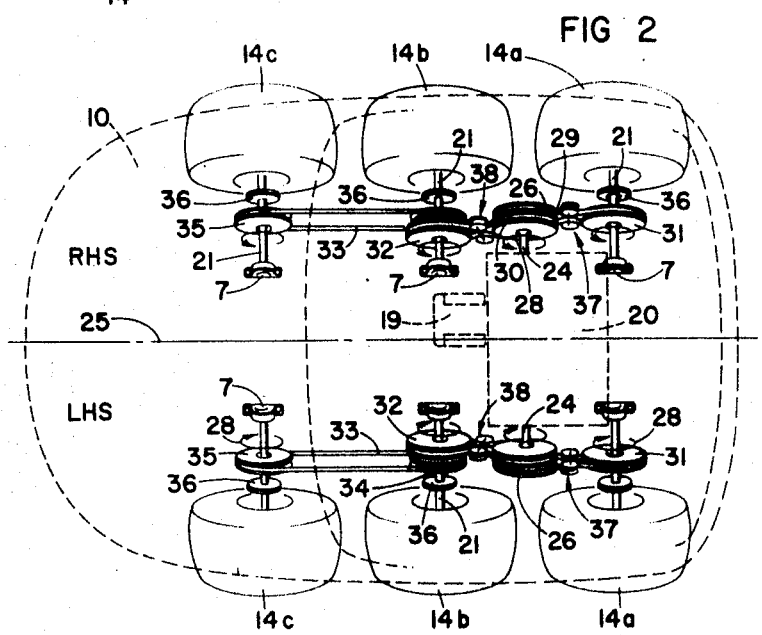
FIG. 2 is a plan view of the vehicle shown in dotted lines with the driving mechanism within the vehicle.
Figure 3:
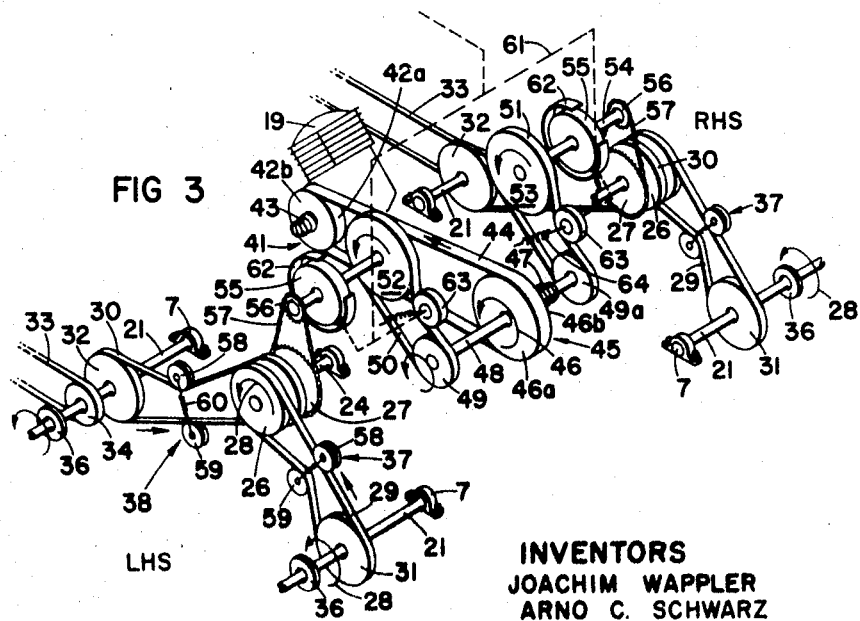
FIG. 3 is a perspective view of a schematic of the side drive train system for the vehicle.

FIG. 2 is a plan view of the vehicle showing the body 10 in dotted lines so as to illustrate better the driving mechanism operating with the drive means 20 in connection with the wheels 14. The driving mechanism is symmetrical about longitudinal axis 25 and being such, only one side will be described. The engine 19 and the drive means 20 are shown in dotted lines. Mounting shaft 24 is shown extending symmetrically therefrom on opposite sides of the drive means 20 and of the longitudinal axis 25 and each shaft 24 has rotatably secured thereon a driving pulley 26 and a sprocket 27 as shown in FIG. 3 which are rotated in a direction shown by the arrow 28 when the operator desires the vehicle to move forward. By means of belts 29 and 30 provided on the drive pulley 26 rear wheels 14a and midwheels 14b rotate in the direction shown by arrow 28. Belt 29 engages the driving pulley 26 and a rear wheel pulley 31 and the belt 30 engages the driving pulley 26 and a midwheel pulley 32 whereby power is independently transmitted from the drive means 20 to each wheel on the vehicle. Belt 33 extends between an auxiliary pulley 34 secured on the midwheel axle 21 and a front wheel pulley 35 to transmit power to the front wheels 14a. The axles 21 of the wheels 14 extend out of the undercarriage 12 of the vehicle and require a watertight seal 36 on each axle to prevent any water from coming into the vehicle if the vehicle is travelling in water. The axles 21 of the wheels 14 are adapted to rotate in support members 7 which are suitably secured to the frame (not shown). Associated with belts 29 and 30 are tension means 37 and 38 causing the belts 29 and 30 to remain taut and in contact with their associated pulleys.

FIG. 3 is a schematic view of the drive means 20 which drives the wheels 14. It is to be noted that the right-hand side is symmetrical to the left-hand side, however, if an identical part is important for the description thereof a different number will be used instead of using the same number on both sides. The internal combustion engine 19 provides the power to drive the drive means 20 and is preferably a two-stroke 197 cc. with a manual starter. Engine support members (not shown) are bolted to the bottom of the vehicle at one end thereof and the other end is fastened to a cross support member. An engine variable pulley 41 is secured to the output shaft of the engine 19. The engine variable pulley 41 comprises a fixed plate 42a and a movable plate 42b between the plates 42a and 42b is positioned a spring 43 which urges the movable plate 42b towards the fixed plate 42a when the engine 19 is speeded up. Belt 44 engages a main variable pulley 45 which travels in the direction shown by the arrow 46. The main variable pulley 45 is similar to the engine variable pulley 41 with a fixed plate 46a and a movable plate 46b with the spring 47 between them. The variable pulley 45 is secured onto a main shaft 48 which extends outwardly on either side of the main variable pulley 45 having secured thereto a first V-belt pulley 49 and a second V-belt pulley 49a at the ends remote from the main variable pulley 45. Belts 50 and 51 are provided on either side of the longitudinal axis 25, belt 50 engaging the first pulley 49 and a third pulley 52 and belt 51 engaging the second pulley 49a and a fourth pulley 53. The third and fourth pulleys 52 and 53 are axially secured on separate rotatable shafts 54 with a brake drum 55 and a sprocket 56 axially secured on each shaft 54 also. A chain 57 extends between the sprockets 27 and 56 to give a desired transmission ratio. Tension means 37 and 38 are used for keeping the belts 29 and 30 taut on their associated pulleys and comprise a pair of tension rollers 58 and 59 connected together by a spring means 60. It will be understood that in this way belts and pulleys can be used in the driving mechanism. The belts 29 and 30 which transmit the power from the drive pulley 26 to the wheels 14 must be maintained taut at all times so that there will not be any slipping of the belts on their associated pulleys. The tension rollers 58 and 59 have a channel cut in the contact surface so that the belts will make better contact with these tension rollers. This will be described in more detail later.

A braking and steering control system 61 is indicated schematically in FIG. 3 as a dotted line going from a control means (not shown) to both brake means 62 and belt tension release means 63. The brake means 62 cooperate with the brake drums 55 and permit the operator of the vehicle to either brake both sets of wheels on both sides of the vehicle in unison or one side separate from the other selectively for steering purposes. The belt tension release means 63 are held in position adjacent the belts 50 and 51 by a spring means 64 which tends to draw each tension release means 63 into contact with the belts. The belts function as clutch mechanisms for transmitting power to each side separately of the other and the tension release means 63 are drawn towards the belts when the operator wishes to have the vehicle move forward as the belts 50 and 51 become taut and rotate the third and fourth pulleys 52 and 53 respectively. However, when the operator wishes to brake the vehicle the tension release means 63 are drawn away from the belts 50 and 51 so that the belts slip on the associated pulleys and do not drive the wheels causing the vehicle to stop.

FIG. 4 is an elevation view showing how the tension means 37 and 38 are positioned in relation to the belts 29 and 30 and also how they are connected to the frame of the vehicle. The frame has an upper member 65 and a lower member 66 with vertical members 67 and 68 therebetween. The frame supports on the left-hand side of the elevation view are identical to the frame supports described on the right-hand side. Connected to the vertical member 67 is a crossmember 69 with holes for pins 70 to pass therethrough. Pin 70 connects a supporting member 71 to the crossmember 69 and the support member 71 is rotatably thereon. At the end remote from pin 70 is a tension roller 58 connected to the supporting member 71 by pin 72.

In the lower portion of the vertical members 67 is a hole for a pin 73 to which are rotatably connected supporting members 74 and 75. At the end remote from the pin 73 is a pin 76 to support the tension roller 59 thereon. Connected between the pin 72 of the upper tension roller 58 and the pin 75 of the lower tension roller 59 is the spring means 60 which urges the roller to make contact with the belt. The spring means 60 is adapted to hold the tension rollers 58 and 59 in contact with the side of the belt associated therewith and give a taut belt.

In operation, as shown in FIG. 5 in the dotted lines, when the operator wishes to have the engine drive the wheels 14 forward, the driving pulley 26 is rotated in the direction of the arrow 28. The belt 30 then engages the midwheel pulley 32 and the midwheel 14b resting on the ground offers resistance to rotation. The tension means 38 riding on an upper portion of the belt 30 must adjust itself so that the belt 30 transmits the rotational force of the driving pulley 26 to the midwheel pulley 32. The upper part of the belt 30 will lift the upper tension roller 58 which resists the movement by producing a force acting along the spring 60. The tension roller 58 rotates on the upper portion of the belt 30 but the spring means 60 draws up the lower tension roller 59 into a lower portion of the belt 30, which is not as taut as the upper portion, causing the belts to have more surface contact and frictional engagement on the pulleys which assist the driving pulley 26 to transmit the rotational force to all the wheels 14.

As shown in the solid outline of FIG. 5 the rotational power from the drive means 20 through the driving pulley 26 is removed. The midwheel 14b continues to rotate in a forward direction because of inertia, driving the pulley 26 until the wheels stop rotating. While this is occuring the midwheel pulley 32 causes the lower portion of the belt 30 to become taut and the lower tension roller 59 is drawn down. The spring means 60 assists the roller 59 by resisting this movement and also draws the upper tension roller 58 down into contact with the upper portion of the belt 30, which is not now taut, making the belt 30 taut again so that the resistance of the driving pulley 26 from being rotated by the wheels 14 will be transmitted to the wheels 14 which will stop.

It will be understood there are alternative methods of keeping the belts taut without the need for use of the tension means 37 and 38. One alternative method is shown in FIG. 6, in which the end of the mounting shaft 24 on which the sprocket 27 and drive pulley 26 are rotatably secured has an offcenter portion 80 which permits eccentric movement of the sprocket 27 and pulley 26. When the shaft 24 is rotated clockwise or counterclockwise the distance between the centers of the pulleys is changed. The loose belts become taut as the pulleys are separated apart. This adjustment could also be used for adjusting the tightness of the length of the chain 57 on the sprockets 56 and 27. The preferred method used to adjust the distance between the sprockets 27 and 56 incorporates the mounting shaft 24 which is a rigid bar securely held, having a sleeve portion 82 thereof. The shaft 24 passes through a hole in the frame member 67 and is secured at the other end thereof to a frame by a tightening nut (not shown). The sprocket 27 and the pulley 26 are attached to a bearing 84 on the offcenter portion 80 which is connected to an endpiece 81 on the sleeve 82 to permit the sprocket 27 and pulley 26 to freely rotate thereon and be driven by the drive means 20. The tightening nut on the shaft 24 must be loosened and then the shaft 24 rotated so that the offcenter portion 80 will eccentrically move the sprockets apart or closer together whichever is desired. Thus, it can be seen that the distance between the associated sprockets can be easily adjusted to have the chain 57 taut.

It would also be conceivable that the rotating shaft 54 with the sprocket 56 securely fixed thereto and a sleeve 85 therearound which is secured to the frame members 65 and 67 could be adjusted to alter the distance between the sprockets 56 and 27. Every pulley in the driving mechanism could have an offcenter adjustment means which would permit the operator to maintain all the belts taut without the need of any tension means acting on the belts to get more frictional contact between the belt and the pulleys.

This invention will be used with a vehicle preferably having at least three driven wheels on each side of the vehicle incorporating low-pressure inflatable tires of variable diameters. A vehicle with four driven wheels on each side could be used but the spacing between the axles of the wheels must be such that the spacing between the wheels themselves is not more than three-quarters of an inch. This is required to give a comfortable ride for the operator of the vehicle without a suspension system. The drive means and driving mechanism on each side of the vehicle could be considered to be a separate drive train system driving the axles of the wheel in different arrangement. The arrangement shown in the drawings have the output pulley 26 driven by the drive means 20 and the output pulley 26 driving the midwheel and rear wheel by a belt and pulley mechanism. The front wheel is driven by an auxiliary pulley 34 on the midwheel axle so that all the wheels rotate in unison. Another arrangement could have all three wheel axles being driven from the output pulley 26 for rotation of the wheels in unison. Still another arrangement could have the drive means 20 driving at least one wheel axle directly and the other wheel axles being driven by belt and pulley mechanisms connected directly to the driven wheel axle for rotation of all three wheels in unison. Under normal operating conditions, all the wheels will rotate in unison, however, if there are any abnormal operating conditions some slipping of the belts on the pulleys will occur and nonuniform rotation of the wheel will result.

Also with this invention frictional belts are preferably used rather than say toothed belts which must be operated in fixed positional relation to their associated sprockets or pulleys.

The foregoing is a description of a preferred embodiment of the invention which is here made by way of example only.

What we claim is:

1. In combination with a motor-driven vehicle having driven wheels incorporating low-pressure inflatable tires of variable diameters with at least three driven wheels on separate axles on each side of said vehicle, and having separate side driven train systems driven by said motor and transmitting power from said motor to said driven wheels on each side of said vehicle respectively;

a separate wheel pulley member driveably associated with each of said axles;

frictional belt drive means engaging said pulley members for rotation thereof in unison under normal operating conditions, and slipping under abnormal operating conditions to permit nonuniform rotation thereof;

adjustable output pulley means driven directly from said side driven train means offcenter adjustable bearing means mounting said adjustable output pulley in said vehicle;

oversize drive belt means extending between said adjustable output pulley and at least one of said separate wheel pulley members, and, reversible spring loaded belt tension means tensionably engaging both sides of said oversize drive belt means for positions of said adjustable output pulley means under forward and reverse operation thereof.

2. The combination, as described in claim 1, including means driving at least two of said axles directly from said side drive train means.

3. The combination, as described in claim 1, including oversize drive belt means driving at least two of said axles directly from said output pulley means.

4. The combination, as described in claim 3, including tension-applying means operatively associated with both of said oversize belt drive means and adapted to assist said frictional belt drive means engaging said pulley members.

5. The combination, as described in claim 1, wherein said tension-applying means comprises:

first and second rollers;

rotatable roller mounting means adapted to be secured in said vehicle and swingably supporting said first and second rollers; on opposite sides of said oversize drive belt means, and, spring means connected between said first and second tension rollers and adapted to engageably hold each of said tension rollers against opposite portions of said belt drive means.